us006697122B2

United States Patent
Kim

(10) Patent No.: US 6,697,122 B2
(45) Date of Patent: Feb. 24, 2004

(54) APPARATUS FOR ADAPTIVELY PROCESSING AN EXTERNALLY INPUT VIDEO SIGNAL IN DIGITAL TELEVISION

(75) Inventor: Byung-hee Kim, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 435 days.

(21) Appl. No.: 09/790,798

(22) Filed: Feb. 23, 2001

(65) Prior Publication Data

US 2002/0024615 A1 Feb. 28, 2002

(30) Foreign Application Priority Data

Aug. 29, 2000 (KR) ............................................. 00-50353

(51) Int. Cl.⁷ ................................................. H04N 7/01
(52) U.S. Cl. ..................... 348/554; 348/555; 348/705; 348/448; 348/446
(58) Field of Search ................................. 348/554, 555, 348/448, 446, 458, 556, 705, 706, 441, 469, 521, 525, 540, 659, 660; 345/603, 604

(56) References Cited

U.S. PATENT DOCUMENTS

| 4,677,482 A | * | 6/1987 | Lewis, Jr. ..................... 348/448 |
| 4,897,716 A | * | 1/1990 | Drewery et al. ............. 348/452 |
| 5,132,793 A | * | 7/1992 | Hirahata et al. ............. 348/556 |
| 5,530,484 A | * | 6/1996 | Bhatt et al. .................. 348/556 |
| 5,610,661 A |   | 3/1997 | Bhatt |
| 5,963,261 A | * | 10/1999 | Dean ........................... 348/446 |
| 6,040,869 A | * | 3/2000 | Dischert ....................... 348/448 |
| 6,064,444 A | * | 5/2000 | Miyazaki et al. ............. 348/581 |
| 6,069,664 A | * | 5/2000 | Zhu et al. .................... 348/448 |
| 6,166,773 A | * | 12/2000 | Greggain et al. ........... 348/448 |
| 6,268,886 B1 | * | 7/2001 | Choi ............................ 348/448 |
| 6,268,887 B1 | * | 7/2001 | Watanabe et al. ........... 348/554 |
| 6,366,329 B1 | * | 4/2002 | Oh .............................. 348/744 |
| 6,437,828 B1 | * | 8/2002 | Chambers et al. .......... 348/458 |
| 6,577,348 B1 | * | 6/2003 | Park ........................... 348/554 |
| 6,580,461 B2 | * | 6/2003 | Chambers et al. .......... 348/458 |

OTHER PUBLICATIONS

Korean Patent Office Action in corresponding Ser No. 10–2000–0050353 issued on May 31, 2002.
English Translation for Korean Patent Office Action in corresponding Ser. No. 10–2000–0050353 issued on May 31 2002.

* cited by examiner

Primary Examiner—Michael H. Lee
Assistant Examiner—Jean W. Désir
(74) Attorney, Agent, or Firm—Robert E. Bushnell, Esq.

(57) ABSTRACT

An apparatus for processing a signal in a digital television, and more particularly, an apparatus for adaptively processing an externally-input video signal in a digital television, in which a signal processing route is controlled to automatically determine the type of a video signal, which is input to an external input terminal, and to adaptively process the video signal regardless of whether the signal is an interlaced scanned video signal or a progressive scanned video signal, is provided. Accordingly, it is determined whether the externally input video signal is a 1H video signal or a 2H video signal, and signal processing is performed by deciding to use a signal processing route which is automatically adaptive to the video signal, thereby enabling the signal processing even in a case where a 2H video signal is input to the external input by determining the standard of the video signal input to the external input terminal, and performing signal processing which is automatically adaptive to the video signal.

10 Claims, 2 Drawing Sheets

APPARATUS FOR ADAPTIVELY PROCESSING AN EXTERNALLY INPUT VIDEO SIGNAL IN DIGITAL TELEVISION

CLAIM OF PRIORITY

This application makes reference to, incorporates the same herein, and claims all benefits in accruing under 35 U.S.C § 119 from an application entitled Apparatus For Adaptively Processing Externally-Inputted Video Signal In Digital Television earlier filed in the Korean Industrial Property Office on Aug. 29, 2000, and there duly assigned Serial No. 2000-50353 by that Office.

BACKGROUND OF THE INVENTION

1. Field of the Invention

The present invention relates to an apparatus for processing a signal in a digital television, and more particularly, to an apparatus for adaptively processing an externally-input video signal in a digital television, in which a signal processing route is controlled to automatically determine the type of a video signal, which is input to an external input terminal, and to adaptively process the video signal regardless of whether the signal is an interlaced scanned video signal or a progressive scanned video signal.

2. Description of the Related Art

In general, a progressive scan converting method is applied to a digital television to improve image quality. In the progressive scan converting method, the vertical frequency of a video signal is not changed, and an interpolated line is inserted between each of the horizontal lines of a field signal using a motion vector, and then the horizontal frequency of the video signal is doubled.

A signal in which the horizontal frequency of the video signal is doubled by the progressive scan converting method is referred to as a video signal having a horizontal sweep rate of 2H, and a conventional interlaced scanning video signal, which is not converted into a progressive scanning video signal, is referred to as a video signal having a horizontal sweep rate of 1H. The externally input 1H video signal is processed and output in the digital television by the above method.

According to recent developments in the technology, however, in a signal processing apparatus such as a DVDP (digital video disk player), the 1H video signal and/or the 2H video signal are/is output in accordance with the products specification. Accordingly, it has been determined that there is a problem in that the video signal input in the form of the 2H video signal cannot be processed in the digital television using the above converting method.

SUMMARY OF THE INVENTION

To solve the above problem, it is an object of the present invention to provide an apparatus for adaptively processing an externally-input video signal in a digital television, in which the standard of a video signal input from a video input terminal of the digital television is determined, and a signal processing block is controlled to automatically adapt to a video signal having a 1H sweep rate or a video signal having a 2H sweep rate according to the standard of the determined video signal.

Accordingly, to achieve the above object, there is provided an apparatus for adaptively processing an externally input video signal in a digital television, for processing a broadcasting signal, which is received and decoded via an antenna, and a video signal which is input to an external input terminal. The apparatus includes a first switching unit for switching input terminals and selectively outputting a received decoded broadcasting signal or the video signal received via the external input terminal by a first switching control signal; a synchronizing signal detecting unit for receiving the video signal output from the first switching unit and detecting a synchronizing signal; a control unit for generating the first switching control signal to select an input signal which corresponds to a video input mode selected by a user, determining the frequency of the synchronizing signal detected and output from the synchronizing signal detecting unit, and generating a second switching control signal to switch the input signal to an output terminal which corresponds to the standard of the video signal output from the first switching unit; a second switching unit for receiving the video signal output from the first switching unit, outputting a video signal having a 1H horizontal sweep rate to a first output terminal and a video signal having a 2H horizontal sweep rate to a second output terminal by the second switching control signal; a progressive scan converting unit for receiving the video signal having a 1H horizontal sweep rate of the first output terminal of the second switching unit, converting the video signal having a 1H horizontal sweep rate into a video signal having a 2H horizontal sweep rate, the horizontal frequency of which is doubled by line interpolation; and a matrix processing unit for receiving a signal output from the second output terminal of the second switching unit or an output signal of the progressive scan converting unit for converting the received signal into an R, G, B signal.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
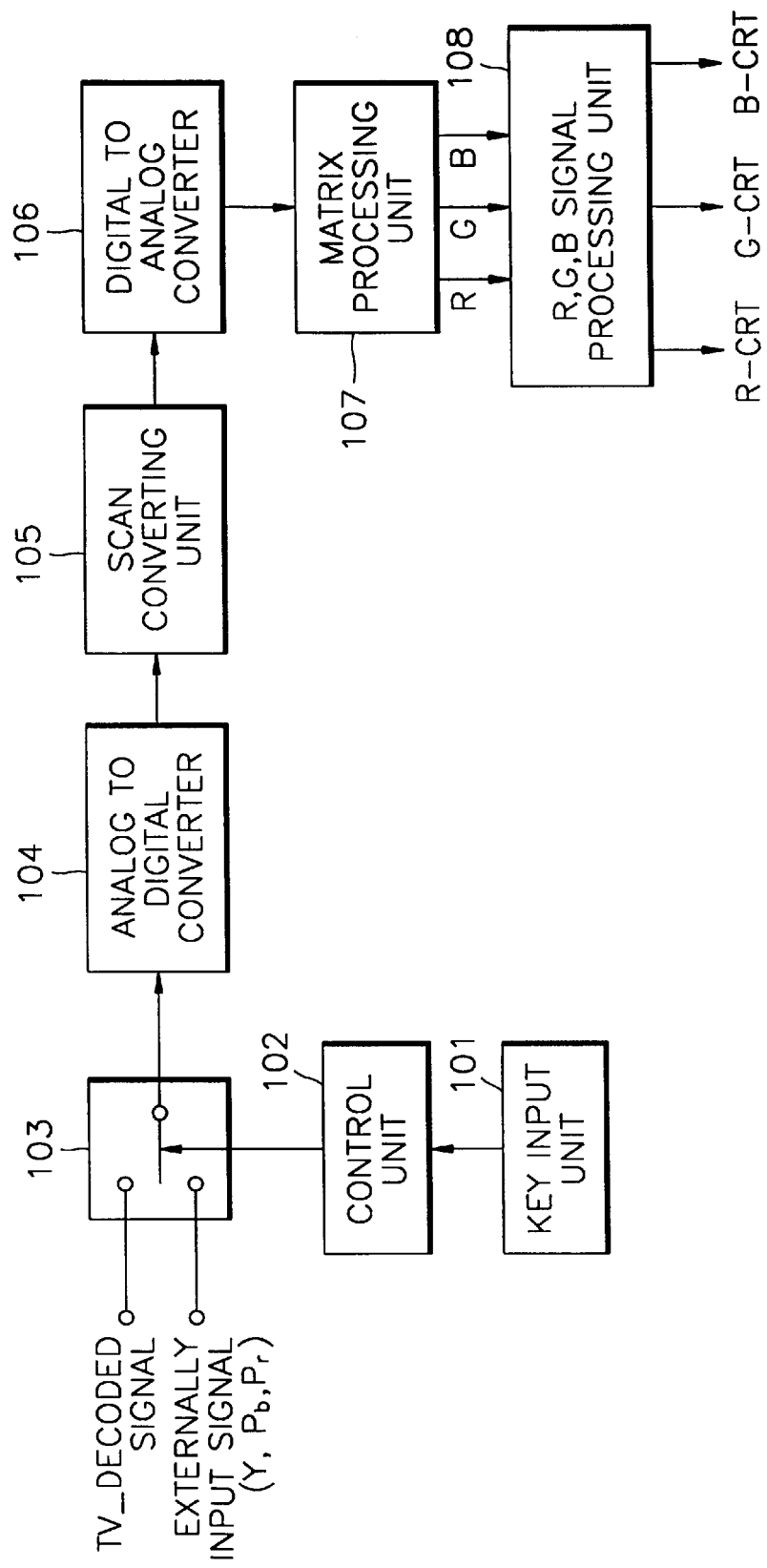
FIG. 1 is a block diagram of a exemplary apparatus for processing an externally input video signal in a digital television.

As shown in FIG. 1, a exemplary apparatus for processing an externally input video signal in a digital television includes a key input unit 101, a control unit 102, a switching unit 103, an analog-to-digital converter 104, a scan converting unit 105, a digital-to-analog converter 106, a matrix processing unit 107, and R, G, B signal processing unit 108.

The key input unit 101 is composed of keys (not shown) to select various functions of the digital television including a mode key for selecting a TV mode for processing a broadcast signal received via an antenna (not shown) and outputting the broadcast signal to a Braun tube (not shown), or selecting a video mode (e.g., a video signal output from a video playback device such as DVD player, a VCR, etc.) for selecting a video input signal input from an external input terminal, processing the video input signal, and outputting the video input signal to the Braun tube (not shown).

When a user selects, for example, a video mode using the key input unit 101, the control unit 102 controls a switching terminal of the switching unit 103, for selecting between a TV-decoded signal having a horizontal sweep rate of 1H and the externally input signal having a horizontal sweep rate of 1H which are applied to input terminals of the switching unit 103, and outputs the externally input signal. As a result, the externally input signal is output through an output terminal of the switching unit 103, and the output externally input signal is converted into a digital signal by the analog-to-digital converter 104. Then, if the externally input signal has a horizontal scan rate of 1H, the 1H video signal is converted into a 2H video signal by a line interpolation method performed by the scan converting unit 105 and the horizontal frequency of the video signal is doubled. Next, the 2H video signal is converted into an analog signal by the digital-to-analog converter 106, and signals Y, Pb, and Pr, luminance signal Y and color-difference signals Pb and Pr output by the digital-to-analog converter 106, are converted into R, G, B signals by the matrix processing unit 107. Next, control of various picture qualities is achieved by performing signal correction processing such as brightness control and gamma correction by the R, G, B signal processing unit 108, and then, voltages R-CRT, G-CRT and B-CRT for driving an RGB CRT (not shown) are generated. If the externally input video signal has a horizontal scanning rate of 2H, however, there is a problem in that the video signal input in the form of the 2H video signal cannot be processed for use in the television using the apparatus of FIG. 1.

Figure 2:
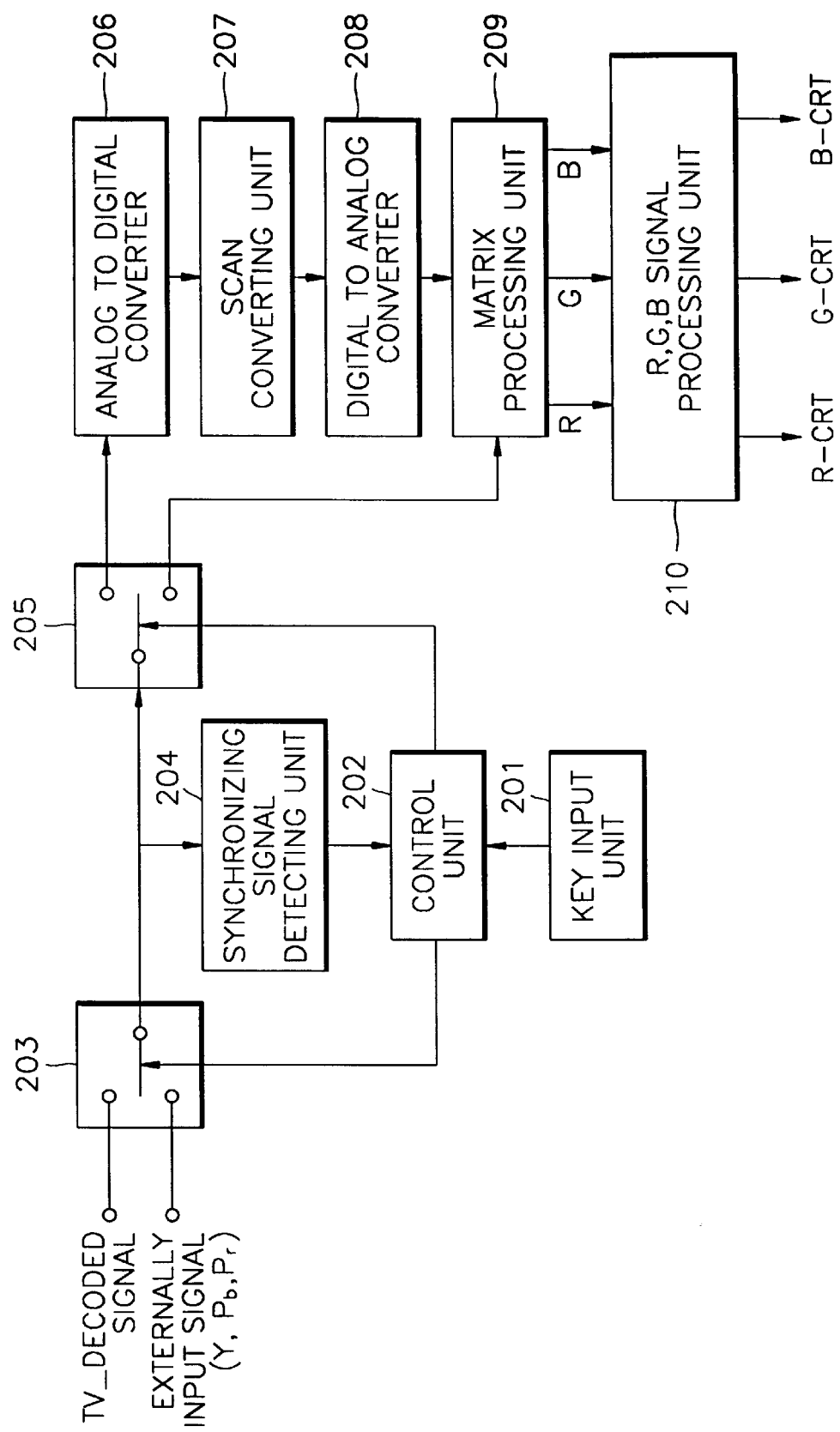
FIG. 2 is a block diagram of an apparatus for adaptively processing an externally input video signal in a digital television according to the present invention.

Referring to FIG.2, an apparatus for adaptively processing an externally-input video signal in a digital television according to the present invention includes a key input unit 201, a control unit 202, a first switching unit 203, a synchronizing signal detecting unit 204, a second switching unit 205, an analog-to-digital converter 206, a scan converting unit 207, a digital-to-analog converter 208, a matrix processing unit 209, and an R, G, B signal processing unit 210.

Here, the analog-to-digital converter 206, the scan converting unit 207, and the digital-to-analog converter 208 are referred to as a progressive scan converting unit.

A TV decoded signal is applied to a first input terminal of the first switching unit 203, and a video signal of an external input terminal is applied to a second input terminal of the first switching unit 203. In a case where a user selects, using key input unit 201, a TV mode, a signal of the first input terminal is selected by a first switching control signal, which is applied from the control unit 202, and output through an output terminal. In a case where the users selects, using key input unit 201, a video mode, a signal of the second input terminal is selected by the first switching control signal and output through the output terminal.

Here, the video signal of the external input terminal is formed of a luminance signal Y and color-difference signals Pb and Pr, for example, and has either a horizontal scanning rate of 1H or 2H. The video signal of the external input terminal is input as the luminance signal Y and as the color-difference signals Pb and Pr because the amount of information expressing a color video signal is highly reduced, compared with an R, G, B input signal.

The synchronizing signal detecting unit 204 detects the frequency of a video signal output from switching unit 203 and provides a result to control unit 202.

The control unit 202 determines that the video signal is a 1H video signal in a case where the frequency of the synchronizing signal is 15734 Hz in an NTSC mode, and the control unit 202 determines that the video signal is a 2H video signal in a case where the frequency of the synchronizing signal is 2×15734 Hz in an NTSC mode, and then, the control unit 202 generates a second switching control signal for controlling the second switching unit 205.

The second switching unit 205 receives the video signal output from the first switching unit 203 and outputs the input signal, in a case where the input signal is a 1H video signal, to a first output terminal according to the second switching control signal applied from the control unit 202, and outputs the input signal, in a case where the input signal is a 2H video signal, to a second output terminal according to the second switching g control signal.

The first output terminal of the second switching unit 205 is connected to an input terminal of the analog-to-digital converter 206 of the progressive scan converting unit, and the second output terminal of the second switching unit 205 is connected to an input terminal of the matrix processing unit 209.

The progressive scan converting unit doubles the horizontal frequency of the video signal so as to generate a 2H video signal by progressive scan conversion in a case where the input video signal is a 1H video signal, the progressive scan conversion being unnecessary in a case where the input video signal is already a 2H video signal.

The analog-to-digital converter 206 receives the 1H video signal of the first output terminal of the second switching unit 205 and converts the 1H video signal into a 1H digital video signal.

The scan converting unit 207 receives the 1H digital video signal output from the analog-to-digital converter 206 and converts it into a 2H digital video signal by a line interpolation method.

Generally line interpolation methods use a two-dimensional interpolation or a three-dimensional interpolation method. Types of two-dimensional interpolation include vertical average interpolation, window average interpolation, and correlation average interpolation.

In the three-dimensional interpolation method, since line interpolation is adaptively performed according to correlation in the unit of field using a field memory, the reproduction of an image is excellent compared with the two-dimensional interpolation method. However, a field memory having a large capacity memory must be used, and then, material costs are increased. In the vertical average interpolation method among the two-dimensional interpolation methods, pixel data to be interpolated is interpolated as an average of the pixels above and below an adjacent scanning line, and in the window average interpolation method, a pixel data to be interpolated is interpolated as an average of all pixels in the window by setting an adjacent predetermined region centering pixels to a window, and in the correlation average interpolation method, a pixel data to be interpolated is interpolated as an average of the pixels having a high correlation among adjacent pixels. The foregoing interpolation methods are well known in the art and need no further explanation.

The digital-to-analog converter 208 converts the 2H digital video signal output from the scan converting unit 207 into an analog video signal having a luminance signal Y and color-difference signals Pb and Pr.

The matrix processing unit 209 receives the 2H video signal output to the second output terminal of the second switching unit 205, or the 2H video signal output from the digital-to-analog converter 208 and converts the video signal into R, G, B signals by a known matrix operation. That is, the luminance signal Y and color-difference signals Pb and Pr are converted into the R, G, B signals and applies these signal to the R, G, B signal processing unit 210.

The R, G, B signal processing unit 210 performs signal correction processing such as brightness control and gamma correction and generates a voltage for driving an RGB CRT (not shown).

As described above, the present invention determines whether the externally input video signal is a 1H video signal or a 2H video signal and performs signal processing by deciding to use a signal processing route which is automatically adaptive to the video signal. Thus, signal processing is possible even in a case where a 2H video signal is input to the external input terminal.

What is claimed is:

1. An apparatus for adaptively processing externally input video signals for display on a screen of a digital television, said apparatus comprising:

a first switching unit having a first input terminal connected to receive a first video signal, a second input terminal connected to receive a second video signal and an output terminal, said first switching unit being controlled by a first switching control signal to selectively connect said first or second input terminal to said output terminal;

a synchronizing signal detecting unit for detecting a synchronizing signal of the first or second video signal selectively output from the first switching unit via said output terminal;

a control unit, said control unit generating said first switching control signal in response to user selection of a television mode or a video mode, said control unit determining a frequency of the synchronizing signal detected by said synchronizing signal detecting unit, said control unit generating a second switching control signal based on the determined frequency of the synchronizing signal;

a second switching unit having an input terminal connected to the output terminal of said first switching unit for receiving the selected first or second video signal output from the first switching unit, said second switching unit having a first output terminal and a second output terminal, said second switching unit being controlled by said second switching control signal to selectively connect said input terminal of said second switching unit to said first or second output terminal;

a progressive scan converting unit connected to said first output terminal of said second switching unit for converting video signals having a 1H horizontal sweep rate into video signals having a 2H horizontal sweep rate, characterized in that the horizontal sweep rate is doubled by line interpolation; and a matrix processing unit connected to said second output terminal of said second switching unit and additionally connected to an output of said progressive scan converting unit for converting video signals having said 2H horizontal sweep rate into R, G and B video signal components to be processed for display.

2. The apparatus as set forth in claim 1, wherein the first video signal or the second video signal is formed of a luminance signal Y and color-difference signals Pb and Pr, said first video signal being received via an antenna and said second video signal being output from a video playback device.

3. The apparatus as set forth in claim 1, wherein the progressive scan converting unit comprises:

an analog-to-digital converter for converting the video signals received from said first output terminal of said second switching unit into a digital video signal;

a scan converting unit for converting the digital video signal into a digital video signal having the 2H horizontal sweep rate; and a digital-to-analog converter for converting the digital video signal having the 2H horizontal sweep rate into an analog video signal having the 2H horizontal sweep rate.

4. The apparatus as set forth in claim 1, further comprising a key input unit for enabling a user to select one of said television mode and said video mode, wherein said control unit generates said first switching control signal to control said first switching unit to connect said first input terminal to said output terminal when said user selects said television mode and generates said first switching control signal to control said first switching unit to connect said second input terminal to said output terminal when said user selects said video mode.

5. The apparatus as set forth in claim 4, wherein the first video signal or the second video signal is formed of a luminance signal Y and color-difference signals Pb and Pr, said first video signal being received via an antenna and said second video signal being output from a video playback device.

6. An apparatus for adaptively processing externally input video signals for display on a screen of a digital television, said apparatus comprising:

a synchronizing signal detecting unit for detecting a horizontal synchronizing signal of a received video signal;

a control unit for determining a frequency of the horizontal synchronizing signal detected by said synchronizing signal detecting unit, said control unit generating a switching signal based on the determined frequency of the horizontal synchronizing signal;

a switch having an input terminal, a first output terminal and a second output terminal, said received video signal being applied to said input terminal, said switch being controlled by said switching signal to selectively connect said input terminal to said first output terminal when said video signal has a 1H horizontal frequency or to said second output terminal when said video signal has a 2H horizontal frequency;

a progressive scan converting unit connected to said first output terminal for converting, by line interpolation, the video signal having the 1H horizontal frequency into a video signal having the 2H horizontal frequency; and a matrix processing unit connected to said second output terminal of said switch and additionally connected to an output of said progressive scan converting unit for converting the video signal having said 2H horizontal frequency into R, G and B video signal components to be processed for display.

7. The apparatus as set forth in claim 6, further comprising:

a switching unit having a first input terminal connected to receive a first video signal, a second input terminal connected to receive a second video signal and an output terminal connected to said synchronizing signal detecting unit and to said input terminal of said switch; and a key input unit for enabling a user to select one of a television mode and a video mode, wherein said control unit generates a control signal to control said switching unit to connect said first input terminal to said output terminal when said user selects said television mode and generates said control signal to control said switching unit to connect said second input terminal to said output terminal when said user selects said video mode.

8. The apparatus as set forth in claim 6, wherein the progressive scan converting unit comprises:
- an analog-to-digital converter for converting the video signal received from said first output terminal of said switch into a digital video signal;
- a scan converting unit for converting the digital video signal into a digital video signal having the 2H horizontal frequency; and
- a digital-to-analog converter for converting the digital video signal having the 2H horizontal frequency into an analog video signal having the 2H horizontal frequency.

9. The apparatus as set forth in claim 7, wherein the first video signal or the second video signal is formed of a luminance signal Y and color-difference signals Pb and Pr, said first video signal being received via an antenna and said second video signal being output from a video playback device.

10. A method of adaptively processing an externally applied video signal for display on a screen of a digital television, said method comprising the steps of:
- detecting a horizontal frequency of said video signal;
- determining whether said horizontal frequency corresponds to a 1H horizontal sweep rate or a 2H horizontal sweep rate;
- applying the video signal to a matrix processing unit when said horizontal frequency of said video signal corresponds to said 2H horizontal sweep rate;
- applying the video signal to a progressive scan converter when said horizontal frequency of said video signal corresponds to said 1H horizontal sweep rate and converting, by line interpolation, said video signal into a video signal having said 2H horizontal sweep rate for input to said matrix processing unit; and
- converting, by said matrix processing unit, received video signals having said 2H horizontal sweep rate into R, G and B video signal components to be processed for display.

* * * * *